(12) United States Patent
DeLay

(10) Patent No.: US 8,561,829 B1
(45) Date of Patent: Oct. 22, 2013

(54) COMPOSITE PRESSURE VESSEL INCLUDING CRACK ARRESTING BARRIER

(75) Inventor: Thomas K. DeLay, Huntsville, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/544,066

(22) Filed: Jul. 9, 2012

Related U.S. Application Data

(63) Continuation of application No. 12/604,954, filed on Oct. 23, 2009, now abandoned.

(51) Int. Cl.
F17C 1/06 (2006.01)
F17C 1/16 (2006.01)

(52) U.S. Cl.
CPC .... F17C 1/16 (2013.01); F17C 1/06 (2013.01)
USPC .......................................................... 220/588

(58) Field of Classification Search
USPC ................... 220/588, 586, 581, 62.19, 62.11, 220/560.12, 560.04, FOR. 127; 206/0.6
IPC .................. B65D 1/40,3/22, 90/02; F17C 1/16, F17C 1/06, 1/04
See application file for complete search history.

(56) References Cited

U.S. PATENT DOCUMENTS

| | | | | |
|---|---|---|---|---|
| 1,364,786 A | * | 1/1921 | Samuel | 442/64 |
| 1,651,521 A | * | 12/1927 | Lucas-Girardville | 220/589 |
| 2,253,093 A | * | 8/1941 | Ludwig et al. | 138/150 |
| 2,744,043 A | * | 5/1956 | Ramberg | 156/155 |
| 3,150,792 A | * | 9/1964 | Bright | 220/62.19 |
| 3,198,687 A | * | 8/1965 | Royet | 428/138 |
| 3,207,352 A | * | 9/1965 | Reinhart, Jr. | 220/589 |
| 3,390,703 A | * | 7/1968 | Matlow | 138/114 |
| 4,004,706 A | * | 1/1977 | Guldenfels et al. | 220/586 |
| 4,674,674 A | | 6/1987 | Patterson et al. | |
| 4,842,909 A | | 6/1989 | Brassell | |
| 5,202,165 A | | 4/1993 | Lusignea et al. | |
| 5,429,845 A | * | 7/1995 | Newhouse et al. | 428/34.1 |
| 5,632,151 A | | 5/1997 | Baker et al. | |
| 5,840,802 A | * | 11/1998 | DeRudder et al. | 525/63 |
| 2002/0179603 A1 | * | 12/2002 | Darras et al. | 220/62.11 |
| 2004/0020932 A1 | | 2/2004 | Brunnhofer | |
| 2004/0040969 A1 | * | 3/2004 | DeLay et al. | 220/586 |
| 2004/0089440 A1 | | 5/2004 | Sanders | |
| 2004/0256395 A1 | | 12/2004 | Lak et al. | |
| 2006/0054628 A1 | | 3/2006 | Matsuoka et al. | |
| 2006/0169704 A1 | | 8/2006 | Brunnhofer | |

FOREIGN PATENT DOCUMENTS

| | | |
|---|---|---|
| EP | 0379822 B1 | 8/1990 |
| JP | 58121399 A | 7/1983 |
| JP | 2006062320 A | 3/2006 |
| WO | 91/02645 A1 | 3/1991 |
| WO | 00/18225 A1 | 4/2000 |
| WO | 2004/044477 A2 | 5/2004 |

* cited by examiner

Primary Examiner — Jacob K Ackun
Assistant Examiner — Robert J Hicks
(74) Attorney, Agent, or Firm — Peter J. Van Bergen; James J. McGroary

(57) ABSTRACT

A pressure vessel includes a ported fitting having an annular flange formed on an end thereof and a tank that envelopes the annular flange. A crack arresting barrier is bonded to and forming a lining of the tank within the outer surface thereof. The crack arresting barrier includes a cured resin having a post-curing ductility rating of at least approximately 60% through the cured resin, and further includes randomly-oriented fibers positioned in and throughout the cured resin.

14 Claims, 1 Drawing Sheet

COMPOSITE PRESSURE VESSEL INCLUDING CRACK ARRESTING BARRIER

CROSS-REFERENCES TO RELATED APPLICATIONS

This application is a continuation application of U.S. patent application Ser. No. 12/604,954, filed on Oct. 23, 2009 now abandoned.

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

1. Field of the Invention

This invention relates to pressure vessels. More specifically, the invention is a composite pressure vessel that includes a crack arresting barrier as part thereof.

2. Description of the Related Art

The aerospace industry relies heavily on the structural integrity of composite-based, cryogenic-fluid (e.g., liquid hydrogen) storage tanks for its space vehicles. Accordingly, the aerospace industry is very concerned about the formation and propagation of micro-cracks in composite tanks as such cracks can affect a tank's structural performance and provide paths for gas permeation through the tank's wall. While studies quantifying the micro-cracking phenomena are ongoing, methods/system for stopping such crack propagation do not exist. Most current efforts involve process enhancement of "off the shelf" composite tank material and structures, i.e., an orderly wound fiber tank structure permeated with a matrix resin. Current micro-crack studies have demonstrated that crack growth in such composite structures occurs in the matrix resin and travels along the ordered fiber windings. The cracking of the matrix resin affects structural integrity and also provides a leak path for gasses that are to be contained by the structure.

SUMMARY OF THE INVENTION

Accordingly, it is an object of the present invention to provide a pressure vessel that resists cracking.

Another object of the present invention is to provide a pressure vessel that arrests crack propagation.

Still another object of the present invention is to provide a pressure vessel suitable for use in the storage of cryogenic fluids.

Other objects and advantages of the present invention will become more obvious hereinafter in the specification and drawings.

In accordance with the present invention, a pressure vessel includes a rigid ported fitting having an annular flange formed on an end thereof and a rigid tank enveloping the annular flange. The ported fitting fauns an opening of the tank that has an inner surface and an outer surface. A crack arresting barrier is bonded to the tank and forms a lining of the tank within the outer surface thereof. The crack arresting bather also envelopes the annular flange. The crack arresting barrier includes a cured resin having a post-curing ductility rating of at least approximately 60% throughout the cured resin, and further includes randomly-oriented fibers positioned in and throughout the cured resin.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
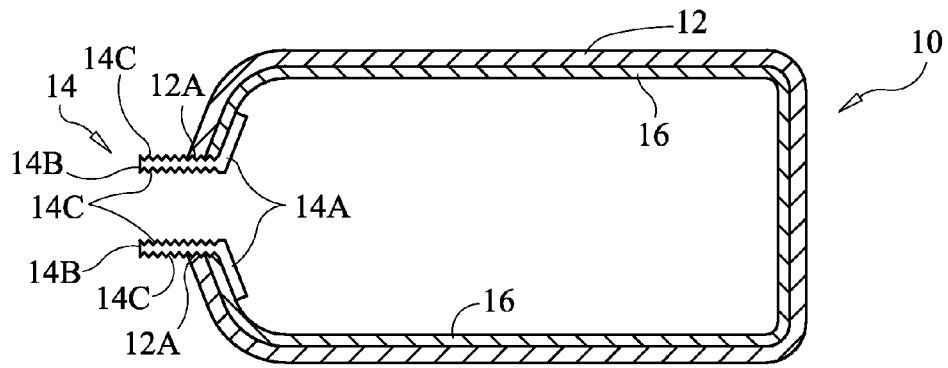
FIG. 1 is a cross-sectional view of a composite pressure vessel incorporating a crack arresting barrier in accordance with an embodiment of the present invention.

Referring now to the drawings and more particularly to FIG. 1, a pressure vessel that includes a crack arresting barrier in accordance with the present invention is illustrated in cross-section and is referenced generally by numeral 10. The size and shape of pressure vessel 10 are not limitations of the present invention as size/shape are typically dictated by the particular application. In general, pressure vessel 10 can be used to contain a fluid material (e.g., gas or liquid) under pressure.

In the illustrated embodiment, pressure vessel 10 includes an outer rigid tank 12 that can be constructed in accordance with a variety of known processes/materials. For example, if pressure vessel 10 is to contain cryogenic fluids, tank 12 could be a composite wrapped structure, i.e., an orderly arrangement of fiber (e.g., carbon fiber) wraps held together in a rigid fashion by a resin matrix that permeates the fiber wraps. Tank 12 has an open-end 12A for receiving a fitting 14 that defines the fluid entry/exit port of pressure vessel 10. Generally speaking, fitting 14 is an open-ended sleeve of rigid material (e.g., metal) having a flared end 14A that is captured within tank 12 adjacent open-end 12A. That is, flared end 14A is essentially an annular flange of fitting 14 that extends radially outward beyond the confines of open-end 12A. A portion 14B of fitting 14 that extends from open-end 12A can be threaded internally and/or externally as indicated at 14C.

Pressure vessel 10 also includes a continuous crack arresting bather 16 that lines the inside surface area of tank 12 and is disposed between flared end 14A and tank 12. In general, barrier 16 bonds to the inside surface of tank 12 as well as flared end 14A of fitting 14. The construction and placement of bather 16 resists cracking and also serves to arrest the propagation of any cracks that do form. Possible constructions for barrier 16 will be explained with reference to FIGS. 2A and 2B where isolated cross-sectional views of a portion of barrier 16 are presented.

Figure 2A:
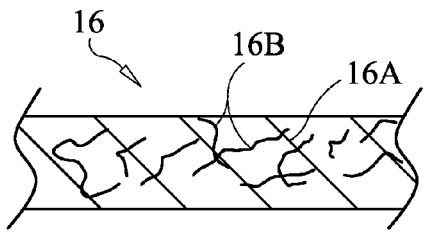
FIG. 2A is an isolated cross-sectional view of a crack arresting barrier in accordance with an embodiment of the present invention.

FIG. 2A illustrates an embodiment of barrier 16 that is defined by a resin 16A (i.e., indicated by cross-hatching) that incorporates randomly oriented fibers 16B therein. Resin 16A is any resin matrix material that remains ductile after curing. For many cryogenic applications the ductility rating of resin 16A is at least approximately 60%, i.e., cured resin 16A can be elongated by 60% prior to failure at room temperature. Fibers 16B can originate as individual fibers that are mixed/dispersed within resin 16A prior to the curing thereof. Fibers 16B can also be in the form. of a felt material in which case resin 16A permeates the felt material composed of fibers 16B. Accordingly, it is to be understood that the means and methods for constructing barrier 16 are not limitations of the present invention as barrier 16 could be laid up, sprayed on, etc., the inner surface of tank 12.

Figure 2B:
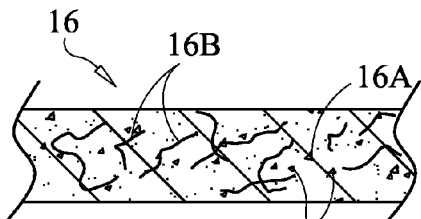
FIG. 2B is an isolated cross-sectional view of a crack arresting barrier in accordance with another embodiment of the present invention.

FIG. 2B illustrates another embodiment of barrier 16 that includes resin 16A and fibers 16B as described above, and further includes nano-sized particles 16C mixed in resin 16A. Particles 16C can be any of a variety of organic or inorganic filler particles. When included in barrier 16, particles 16C aid in the prevention of gas permeation through barrier 16 if a micro-crack should develop.

Regardless of its particular construction details, crack arresting barrier 16 functions as follows. In terms of crack resistance, the ductility of resin 16A allows barrier 16 to yield or flex without cracking. Thus is important as pressure vessel 10 experiences pressure cycles. Since pressure vessel 10 does not rely on barrier 16 for strength, such yielding of barrier 16 does not impact the structural integrity of pressure vessel 10. Furthermore, this yielding feature of barrier 16 allows it to also function as a shear ply between tank 12 and fitting 14. More specifically, barrier 16 bonds to both tank 12 (near open end 12A) and flared end 14A, and yields to shear forces that can develop between tank 12 and flared end 14A during pressure cycling. Accordingly, even though barrier 16 does not possess the strength of the materials used for tank 12 and fitting 14, barrier 16 contributes to the overall structural integrity of pressure vessel 10 by forming a shear ply between tank 12 and flared end 14A. Still further, in the event that a micro-crack develops in bather 16, propagation of such a crack is limited by the random orientations of fibers 16B. That is, the random orientations of fibers 16B interrupt cracks in barrier 16.

Figure 3:
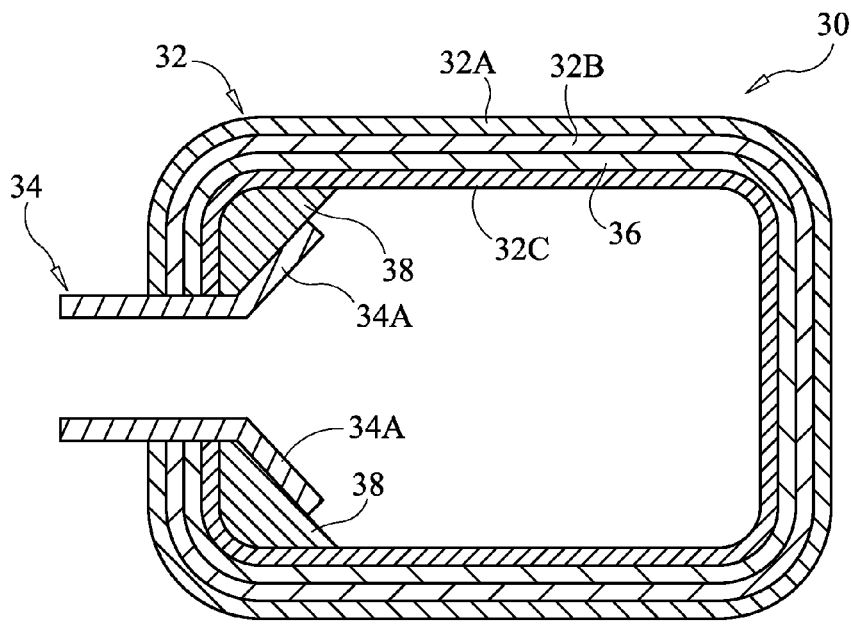
FIG. 3 is a cross-sectional view of a composite pressure vessel incorporating a crack arresting barrier in accordance with another embodiment of the present invention.

It is to be understood that the present invention is not limited to the pressure vessel construction described above. For example, FIG. 3 illustrates a pressure vessel 30 that includes a rigid tank 32 made from multiple layers such as three rigid layers 32A, 32B and 32C. The particular construction of layers 32A-32C is not a limitation of the present invention. A rigid fitting 34 is disposed in tank 32 with a flared end 34A thereof being disposed adjacent inner most layer 32C. Pressure vessel 30 also includes a crack arresting barrier 36 disposed continuously between layers 32B and 32C. Note that barrier 36 additionally or alternatively be placed between layers 32A and 32B without departing from the scope of the present invention. Barrier 36 is a ductile composite configured as one of the above-described embodiments of barrier 16. In addition, pressure vessel 30 includes a flexible collar 38 disposed between and coupled to tank layer 32C and flared end 34A. Collar 38 is also a ductile composite configured as one of the above-described embodiments of barrier 16. Accordingly, collar 38 forms a shear ply between tank 32 and fitting 34.

The advantages of the present invention are numerous. A simple crack arresting barrier of a ductile resin incorporating randomly oriented fibers improves the overall structural integrity of a pressure vessel by inhibiting crack formation/propagation and gas permeation. The barrier can also form a shear ply between the vessel's rigid tank and rigid ported fitting. The design is suitable for use in cryogenic and non-cryogenic applications.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

The invention claimed is:

1. A pressure vessel, comprising:
a rigid ported fitting having an annular flange formed on an end thereof;
a rigid tank enveloping said annular flange wherein said ported fitting forms an opening of said tank, said tank having an inner surface and an outer surface; and
a crack arresting barrier bonded to and forming a lining of said tank within said outer surface thereof, said crack arresting barrier enveloping said annular flange, said crack arresting barrier including a cured resin having a post-curing ductility rating of at least approximately 60% throughout said cured resin, said crack arresting barrier further including (i) randomly-oriented fibers positioned in and throughout said cured resin, and (ii) nano-sized particles mixed in said cured resin.

2. A pressure vessel as in claim 1, wherein said tank is a composite wrapped tank.

3. A pressure vessel as in claim 1, wherein said crack arresting barrier comprises a continuous layer disposed between the entirety of said outer surface of said tank and the entirety of said inner surface of said tank.

4. A pressure vessel as in claim 1, wherein said crack arresting barrier comprises a continuous layer bonded to the entirety of said inner surface of said tank and bonded to said annular flange.

5. A pressure vessel as in claim 1, wherein said fibers are incorporated in a felt material.

6. A pressure vessel as in claim 1, wherein said fibers are individual fibers dispersed in said cured resin.

7. A pressure vessel, comprising:
a cryogenic tank having an open end;
an open-ended sleeve having a threaded end and a flared end with said flared end disposed in said open end of said cryogenic tank; and
a crack arresting barrier lining and bonded to the inside surface area of said cryogenic tank, said crack arresting barrier bonded to said flared end of said sleeve, said crack arresting barrier including a cured resin having a post-curing ductility rating of at least approximately 60% throughout said cured resin, said crack arresting barrier further including (i) randomly-oriented fibers positioned in and throughout said cured resin, and (ii) nano-sized particles mixed in said cured resin.

8. A pressure vessel as in claim 7, wherein said cryogenic tank is a composite wrapped tank.

9. A pressure vessel as in claim 7, wherein said fibers are incorporated in a felt material.

10. A pressure vessel as in claim 7, wherein said fibers are individual fibers dispersed in said cured resin.

11. A pressure vessel as in claim 7, wherein said sleeve is a metal sleeve.

12. A pressure vessel, comprising:
a tank having an open end;
an open-ended sleeve having a threaded end and a flared end with said flared end disposed in said open end of said tank; and
a crack arresting barrier lining and bonded to the inside surface area of said tank, said crack arresting barrier bonded to said flared end of said sleeve, said crack arresting barrier including a felt permeated with a cured resin having nano-sized particles mixed in and throughout said cured resin, said cured resin having a post-curing ductility rating of at least approximately 60% throughout said cured resin.

13. A pressure vessel as in claim 12, wherein said tank is a composite wrapped tank.

14. A pressure vessel as in claim 12, wherein said sleeve is a metal sleeve.

* * * * *